Jan. 21, 1941.  C. E. HODGKINS  2,229,568
EYEGLASS TEMPLE ATTACHMENT
Filed June 20, 1940

Inventor
Charles E. Hodgkins,
By Clarence A. O'Brien
Attorney

Patented Jan. 21, 1941

2,229,568

UNITED STATES PATENT OFFICE 2,229,568

EYEGLASS TEMPLE ATTACHMENT

Charles E. Hodgkins, South Weymouth, Mass.

Application June 20, 1940, Serial No. 341,546

1 Claim. (Cl. 88—52)

This invention relates to eyeglass temple attachments of a generally similar nature to that constituting the subject matter of my co-pending application Ser. No. 311,207, filed Dec. 27, 1939, upon which the present device constitutes an improvement.

As with the device constituting the subject matter of my aforementioned co-pending application, the primary object of the present invention is to provide a temple attachment adapted to fit the front, upper and rear contour of the ear whereby forward and backward sliding movement of the glasses on the nose is positively prevented, thus permanently maintaining the exact distance between the lens and cornea vertex prescribed by the physician for the eyes.

Another very important object of the invention is to provide an attachment of the character described which may be expeditiously mounted and firmly secured in adjusted position on the temple.

Other objects of the invention are to provide an eyeglass temple attachment of the character set forth which will be simple in construction, light in weight, inconspicuous, comfortable and which may be produced at low cost.

The foregoing and other objects and advantages of the invention will become apparent from a study of the following specification, taken in connection with the accompanying drawing wherein like characters of reference designate corresponding parts throughout the several views, and wherein—

Figure 1:
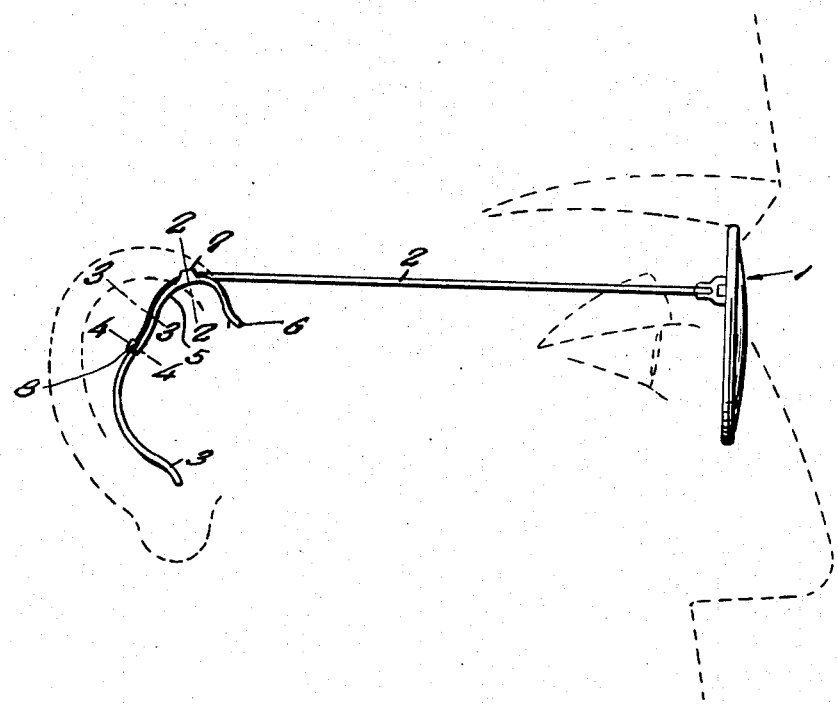

Figure 1 is a view in side elevation, showing an attachment constructed in accordance with the present invention in use on an eyeglass temple.

Figure 2:
Figure 3:
Figure 4:
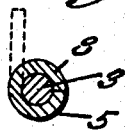

Figures 2, 3 and 4 are cross sectional views, taken substantially on the lines 2—2, 3—3 and 4—4, respectively, of Fig. 1.

Figure 5:
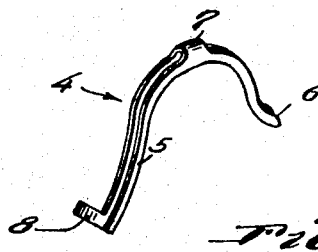

Figure 5 is a perspective view of the device.

Referring now to the drawing in detail, it will be seen that the reference numeral 1 designates generally a conventional pair of eyeglasses comprising temples 2 which include the usual hooks 3 on their free ends.

The embodiment of the present invention which has been illustrated comprises a curved bar of substantially channel shaped cross section which is designated generally by the reference numeral 4, said bar being of any suitable metal.

The bar 4 comprises a portion 5 which receives the temple hook 3 and which conforms to the shape of the back of the ear. The bar 4 further includes a downwardly and forwardly curved forward end portion 6 which is directed away from the temple 2 and which is engageable with the frontal protrusion of the ear.

The bar 4 still further includes a tubular intermediate portion 7 through which the hook 3 is slidable. Formed integrally with the rear end of the portion 5 of the bar 4 is a bendable tongue 8 which, as illustrated to advantage in Fig. 4 of the drawing, is adapted to be bent around the hook 3 in a manner to firmly clamp the attachment in adjusted position.

Of course, two of the devices are to be used on each pair of glasses, one on each temple. The hook 3 is inserted through the tubular intermediate portion 7 of the bar 4 and the device is adjusted to the desired position on the temple. The tongue 8 is then bent over the hook 3 for frictionally clamping the device in adjusted position. The construction of the device is such that it fits correctly the front, upper and rear contour of the ear and prevents either forward or backward sliding movement of the glasses.

It is believed that the many advantages of an eyeglass temple attachment constucted in accordance with the present invention will be readily understood and although a preferred embodiment is as illustrated and described, it is to be understood that changes in the details of construction may be resorted to which will fall within the scope of the invention as claimed.

What is claimed is:

An eyeglass temple attachment comprising a bar of substantially channel shaped cross section adapted to be mounted on a temple, said bar including a curved rear portion for the reception of the hook of the temple and conforming to the shape of the back of the ear, said bar further including a downwardly and forwardly curved front end portion extending away from the temple, said bar being engageable with the front, upper and rear contour of an ear, and means for securing the bar in position on the temple, said means including a tubular intermediate portion on the bar for the reception of the temple, and an integral tongue on one side of the rear end portion of the bar adapted to be bent over the temple for frictionally clamping said bar in position thereon.

CHARLES E. HODGKINS.